United States Patent
Knoop (10) Patent No.: US 10,724,585 B2
(45) Date of Patent: Jul. 28, 2020

(54) BRAKE PAD (71) Applicant: Meritor Heavy Vehicle Braking Systems (UK) Limited, Cwmbran, Gwent (GB)

(72) Inventor: Dietmar Knoop, Gwent (GB)

(73) Assignee: Meritor Heavy Vehicle Braking Systems (UK) Limited, Cwmbran, Gwent (GB)

( * ) Notice: Subject to any disclaimer, the term of this patent is extended or adjusted under 35 U.S.C. 154(b) by 64 days.

(21) Appl. No.: 15/995,482

(22) Filed: Jun. 1, 2018

(65) Prior Publication Data

US 2018/0347650 A1  Dec. 6, 2018

(30) Foreign Application Priority Data

Jun. 2, 2017  (GB) .................................. 1708865.9

(51) Int. Cl.
| | |
|---|---|
| *F16D 55/2255* | (2006.01) |
| *F16D 65/097* | (2006.01) |
| *F16D 65/092* | (2006.01) |
| *F16D 55/00* | (2006.01) |

(52) U.S. Cl.
CPC ....... *F16D 55/2255* (2013.01); *F16D 65/092* (2013.01); *F16D 65/0976* (2013.01); *F16D 65/0978* (2013.01); *F16D 2055/0041* (2013.01); *F16D 2250/0084* (2013.01)

(58) Field of Classification Search
CPC ............. F16D 65/0978; F16D 65/0977; F16D 2055/0041; F16D 65/0972; F16D 65/097; F16D 65/0976; F16D 65/16; F16D 65/56; F16D 65/226; F16D 65/095
See application file for complete search history.

(56) References Cited

U.S. PATENT DOCUMENTS

| | | | |
|---|---|---|---|
| 2,973,837 A | 3/1961 | Wilson | |
| 3,357,523 A | 12/1967 | Reed et al. | |
| 3,677,373 A | 7/1972 | Lucien | |
| 4,364,455 A | 12/1982 | Oshima | |
| 4,609,077 A * | 9/1986 | Nakatsuhara | F16D 55/227 188/250 E |
| 4,685,543 A | 8/1987 | Ziolkowski | |
| 7,849,977 B2 | 12/2010 | Gruber et al. | |

(Continued)

FOREIGN PATENT DOCUMENTS

| | | |
|---|---|---|
| DE | 2038649 A1 | 2/1971 |
| DE | 1952568 A1 | 5/1971 |

(Continued)

OTHER PUBLICATIONS

English translation of DE 102010019471A1 (Year: 2011).*

(Continued)

*Primary Examiner* — Robert A. Siconolfi
*Assistant Examiner* — Mahbubur Rashid
(74) *Attorney, Agent, or Firm* — Brooks Kushman PC (57) ABSTRACT

A brake pad for a heavy vehicle disc brake and a disc brake. The brake pad defines a first and second circumferential surfaces. A first spring forms at least part of the first circumferential surface and is arranged to contact the first circumferential pad abutment surface and urge the brake pad, in use, towards the second circumferential pad abutment surface.

14 Claims, 7 Drawing Sheets

(56) References Cited

U.S. PATENT DOCUMENTS

| | | |
|---|---|---|
| 8,540,061 B1 | 9/2013 | Plantan et al. |
| 2005/0194222 A1 | 9/2005 | Stickney et al. |
| 2006/0175162 A1 | 8/2006 | Thorp |
| 2007/0114102 A1* | 5/2007 | Iraschko ............... F16D 65/095 188/73.38 |
| 2007/0137952 A1 | 6/2007 | Cortinovis et al. |
| 2007/0261927 A1 | 11/2007 | Iraschko et al. |
| 2009/0026028 A1 | 1/2009 | Gassibauer |
| 2009/0159376 A1* | 6/2009 | Rossignol ............ F16D 65/095 188/73.38 |
| 2010/0236876 A1 | 9/2010 | Sarica et al. |
| 2011/0198170 A1 | 8/2011 | Turani et al. |
| 2012/0160616 A1 | 6/2012 | Passalacqua et al. |
| 2013/0277159 A1 | 10/2013 | Borgmeier et al. |
| 2013/0277160 A1 | 10/2013 | Dreher et al. |
| 2014/0047690 A1 | 2/2014 | Plantan et al. |
| 2014/0131148 A1* | 5/2014 | Plantan ................. F16D 65/097 188/73.38 |
| 2014/0367208 A1 | 12/2014 | Miyake et al. |
| 2016/0195147 A1 | 7/2016 | Carney |
| 2016/0250676 A1 | 9/2016 | Borgmeier et al. |
| 2018/0106313 A1 | 4/2018 | Fricke et al. |

FOREIGN PATENT DOCUMENTS

| | | | |
|---|---|---|---|
| DE | 19706123 A1 | 8/1998 | |
| DE | 102007020884 A1 | 11/2008 | |
| DE | 102010019470 A1 | 11/2011 | |
| DE | 102013101781 A1 | 5/2014 | |
| DE | 102016001321 A1 * | 8/2017 | |
| EP | 0730107 A2 | 9/1996 | |
| EP | 1717476 A1 | 11/2006 | |
| EP | 2199640 A1 | 6/2010 | |
| EP | 2644926 A1 * | 10/2013 | |
| EP | 2831445 A1 | 2/2015 | |
| FR | 2680214 A1 | 2/1993 | |
| FR | 2771147 A1 | 5/1999 | |
| FR | 2775742 A1 | 9/1999 | |
| GB | 1045941 A | 10/1966 | |
| GB | 1275440 A * | 5/1972 | ........... F16D 55/228 |
| GB | 2434624 A | 8/2007 | |
| JP | S56160437 A | 12/1981 | |
| JP | S61109928 A | 5/1986 | |
| JP | 2002039238 A | 2/2002 | |
| JP | 2006090392 A | 4/2006 | |
| JP | 2006153139 A | 6/2006 | |
| JP | 2015031295 A | 2/2015 | |
| WO | 2004074705 A1 | 9/2004 | |
| WO | 2004094857 A1 | 11/2004 | |
| WO | 2014028454 A1 | 2/2014 | |

OTHER PUBLICATIONS

UK Patent Office, Search Report for related Application No. GB1708865.9, dated Jul. 21, 2017.

European Patent Office, Extended European Search Report for related Application No. 18175490.4-1012, dated Oct. 17, 2018.

* cited by examiner

BRAKE PAD

TECHNICAL FIELD

The present invention relates to a brake pad, as well as to a heavy vehicle disc brake incorporating a brake pad. In particular, the present invention relates to a brake pad with a spring attached thereto.

BACKGROUND

In known heavy vehicle disc brakes (see FIG. 10) it is usual for the brake pads 111 to be fitted and removed from the disc brake 102 in a radial inward/outward direction with respect to the wheel center via a radial opening in the brake caliper. This arrangement allows brake pad 111 replacement to occur without removal of the brake caliper. This is beneficial as calipers of heavy vehicle brakes are generally too heavy for them to be safely lifted and manipulated by one person, in contrast to disc brakes of light vehicles. The brake pads 111 are held within the disc brake 102 by a pad retainer 192 that extends over the opening across the center of the brake pad 111 and a leaf spring 193 that urges the pad in a radially inward direction.

Figure 10:
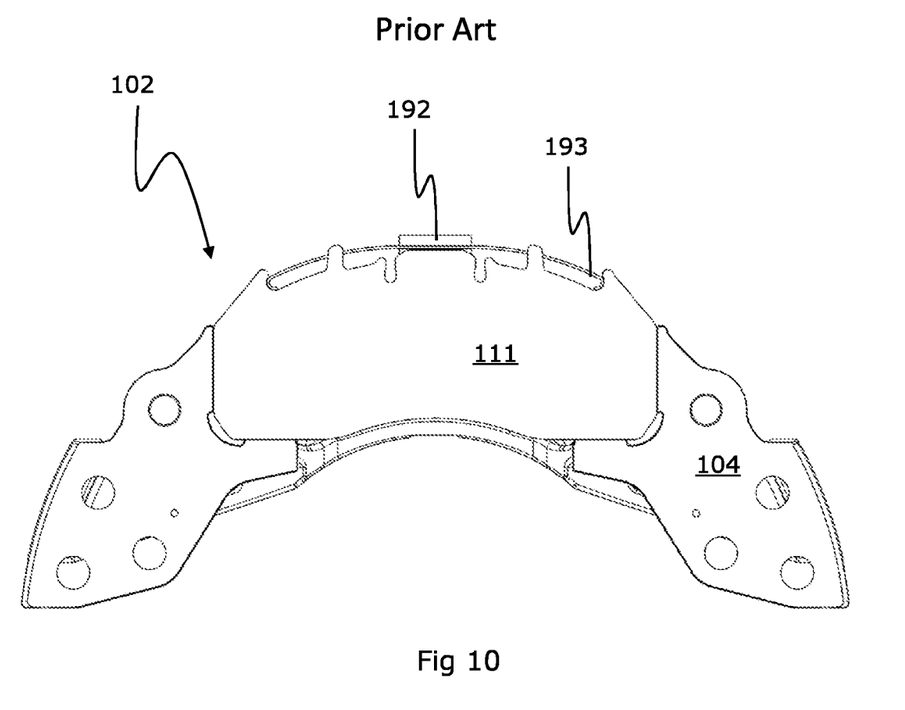
FIG. 10 is a side view of a prior art brake pad and carrier.

The leaf springs locate in use between formations that project radially outwardly from the backplate of the brake pads, and the pad retainer 192. The leaf springs 193 are resilient and act to urge the pads radially inwardly, into contact with their corresponding radial abutments, to minimize rattling whilst allowing the inboard pad to slide. A clearance remains however between the brake pad and corresponding circumferential abutments, and rattling may still occur in this circumferential direction. Further, the formations to locate the leaf springs require the backplate of the brake pads to be enlarged, thus increasing the mass of the brake pads, which is undesirable.

The present invention seeks to overcome or at least mitigate the problems of the prior art.

SUMMARY

A first aspect of the present invention provides a brake pad for a heavy vehicle disc brake, the brake pad comprising: a layer of friction material having a friction face for contacting and retarding rotation of a rotor, the brake pad defining a first circumferential surface and a second circumferential surface for contact with first and second corresponding circumferential pad abutment surfaces of a disc brake in use; the brake pad further comprising a first spring forming at least part of the first circumferential surface and arranged to contact the first circumferential pad abutment surface and urge the brake pad, in use, towards the second circumferential pad abutment surface.

By providing a spring to urge the brake pad circumferentially, the second abutment surface is generally in contact with the second circumferential surface. This leads to a reduction in rattling of the pad within its corresponding support structure and assist in retaining the pad within its corresponding support structure.

The first spring is optionally accommodated within a recess of a first circumferential surface of the brake pad.

This arrangement provides space for resilient deformation of the spring.

The first spring may be a leaf spring.

A leaf spring has an effective, space-efficient shape for a spring in this location.

The leaf spring may be lens-shaped.

A leaf spring of this shape advantageously allows for the effective mounting of the leaf spring to the brake pad.

The first circumferential end surface may be curved and the first spring, at least in a compressed condition, is also generally curved in a similar shape.

By arranging the spring to follow a similar curved profile to the first circumferential surface, the bearing contact is optimized.

A spring force vector of the first spring may act in a generally circumferential direction.

With an appropriately shaped second circumferential surface, this can assist in holding the brake pad within the carrier/caliper.

The first spring may be arranged at an end of the brake pad intended to be the leading end in use.

Advantageously in this orientation, the spring urges the brake pad in the same direction as the rotor under braking, to further assist in reducing pad rattle, and reduces impacts of the pad on the circumferential abutment.

The brake pad may comprise a backplate arranged to support the layer of friction material and the first spring is mounted to the backplate.

Advantageously, mounting the spring to the backplate provides a more robust brake pad.

The backplate may be manufactured from a metal, e.g., sheet metal, having a thickness of up to approximately 4 mm and may define a rear wall and a flange at substantially 90° thereto forming part of the first circumferential surface.

The first spring may be mounted to the flange.

The flange provides a convenient location for securing a spring, e.g., by spot welding, riveting or the like.

Alternatively, the first spring may be formed from the same piece of material as the backplate as a monolithic component.

Using a single piece of material (e.g., single sheet of metal) for the body of the backplate and a spring may further reduce costs.

The brake pad may further comprise a second spring forming at least part of the second circumferential surface and arranged to contact the second circumferential abutment surface.

Providing a spring on the second circumferential surface may further reduce pad rattle.

A further aspect of the present invention provides a heavy vehicle disc brake, the heavy vehicle disc brake comprising: a first brake pad according to the first aspect of the present invention for contacting a face of a brake rotor; a second brake pad for contacting an opposing face of the brake rotor to the first brake pad; a brake caliper for confining the first and second brake pads in at least as inbound-outbound direction; an actuation mechanism housed within the brake caliper for selectively bringing the brake pads into contact with the rotor; and a first and a second brake pad support structure for restraining the first and second brake pads in a circumferential direction respectively; wherein the first support structure comprises first and second abutment structures defining first and second circumferential pad abutment surfaces to contact and support the first brake pad in a circumferential direction.

The first circumferential pad abutment surface may comprise a curved shape complementary to a curved first circumferential surface of the first brake pad.

The second brake pad may be a brake pad according to the first aspect of the present invention.

BRIEF DESCRIPTION OF THE DRAWINGS

Embodiments of the present invention will now be described, by way of example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
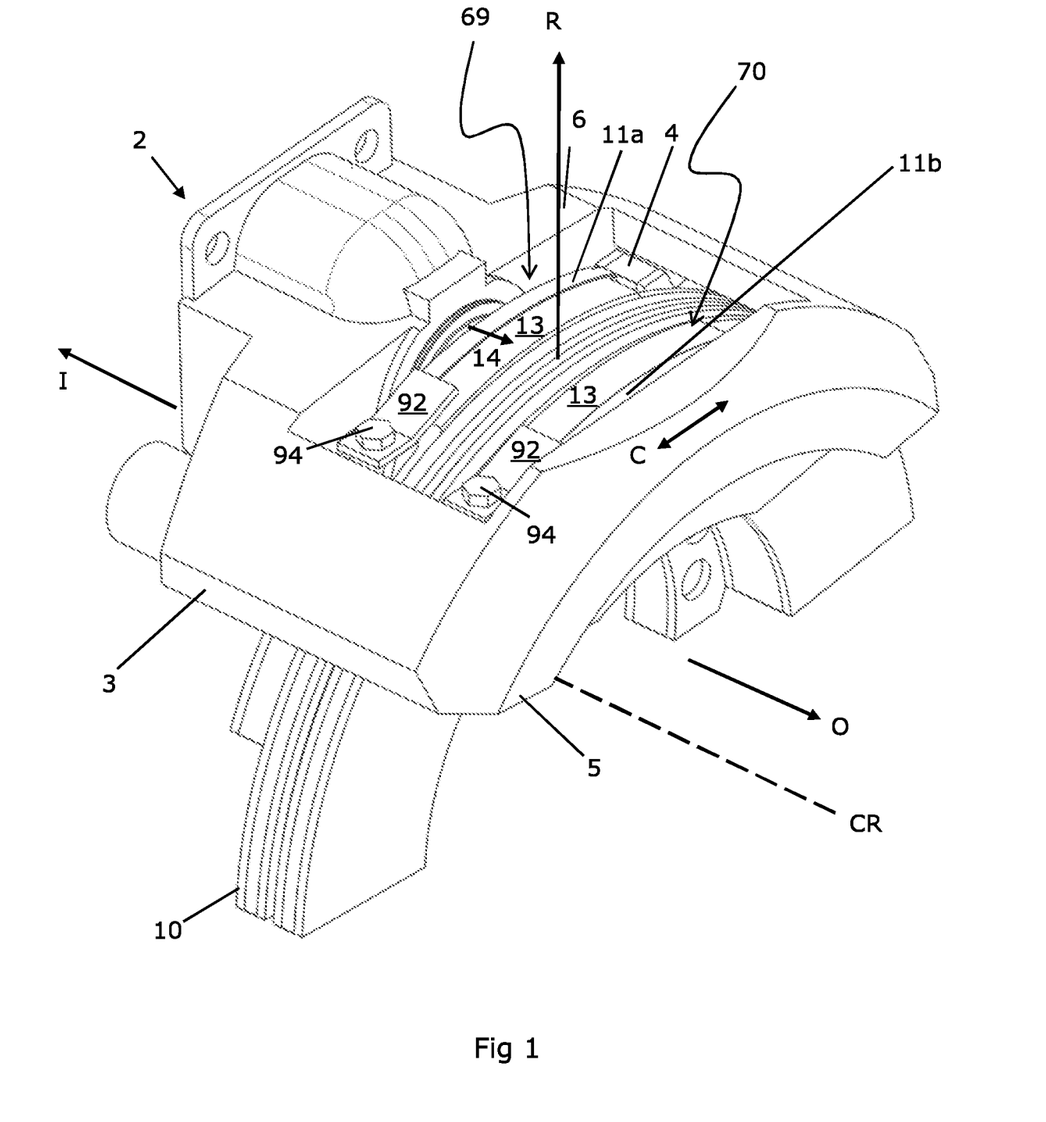
FIG. 1 is an isometric view of a disc brake, according to an embodiment of the present invention.

FIG. 1 illustrates a disc brake 2 of the present invention to into which brake pads of an embodiment of the present invention may be fitted. The disc brake 2 incorporates an actuation mechanism (not visible) comprising a single piston and which is suitable for a commercial vehicle. This type of brake is particularly suitable for lighter duty heavy vehicles, for example smaller trucks, or a trailer of a tractor-trailer combination. In other embodiments the disc brake may be a twin piston brake—for example, a variant of the applicant's existing ELSA 2 family of disc brakes.

Various orientations of the disc brake are described. In particular the directions inboard and outboard refer to the typical orientation of the disc brake when fitted to a vehicle and with reference to the longitudinal center line of the vehicle. In this orientation the brake pad closest to the center of the vehicle is the pad directly actuated by an actuation mechanism and being the inboard pad, and the outboard pad being one mounted to a bridge portion of the caliper. Thus, inboard can be equated with an actuating side of the disc brake, and outboard with a reaction side. The terms radial (denoted by arrow R) describes an orientation with reference to the center of the wheel (rotor). Circumferential (denoted by arrow C), or also called tangential, describe orientations with respect to the brake rotor. Radial refers to a direction towards or away from the center of rotation of the brake rotor, whereas circumferential (C) describes a direction of rotation of the rotor about its center of rotation (denoted CR).

The disc brake 2 comprises a caliper 3 having a housing 6 to accommodate the actuation mechanism and which is slideably mounted on a carrier 4 for movement in an inboard-outboard direction.

The caliper 3 can slide on the carrier 4 in an inboard-outboard direction, by way of first and second guide pins (not shown) as is well known.

An inboard brake pad 11a comprises a layer of friction material 13 and is arranged so that the friction material 13 faces a brake rotor 10 (also known as a brake disc). The inboard brake pad 11a is mounted on the carrier via an inboard brake pad support structure 69. In this embodiment, the inboard brake pad support structure 69 is a window or recess in brake carrier, described in more detail below. The inboard brake pad 11a is moveable in the direction of arrow 14 against the brake rotor 10.

An outboard brake pad 11b, also with a layer of friction material 13, is also provided. The outboard brake pad 11b is mounted to an outboard brake pad support structure 70 as described in further detail below. Suitable components are provided to urge an outboard brake pad 11b against the opposite side of the rotor 10. In this embodiment, the caliper comprises a bridge 5 arranged so as to straddle the rotor 10 and to transmit the reaction force from an inboard operating shaft (not shown) of the actuating mechanism to the outboard pad 11b. In this embodiment the housing 6 and bridge 5 are manufactured as a single monolithic casting, but in other embodiments, the bridge may be bolted or otherwise secured to the housing.

In this embodiment, a spreader plate (not visible) is provided in the form of an enlarged outboard head of the piston. The main function of the spreader plate is to spread the load applied by the single piston across a greater proportion of the circumferential width of the inboard pad 11a, which is particularly useful for high pressure applications (e.g., an emergency stop), to more evenly distribute the load applied to the pads. There is also an effect on wear; i.e., wear closer to the center of the pad (where the piston is applied) can be reduced, to provide a more even distribution of wear.

Figure 2:
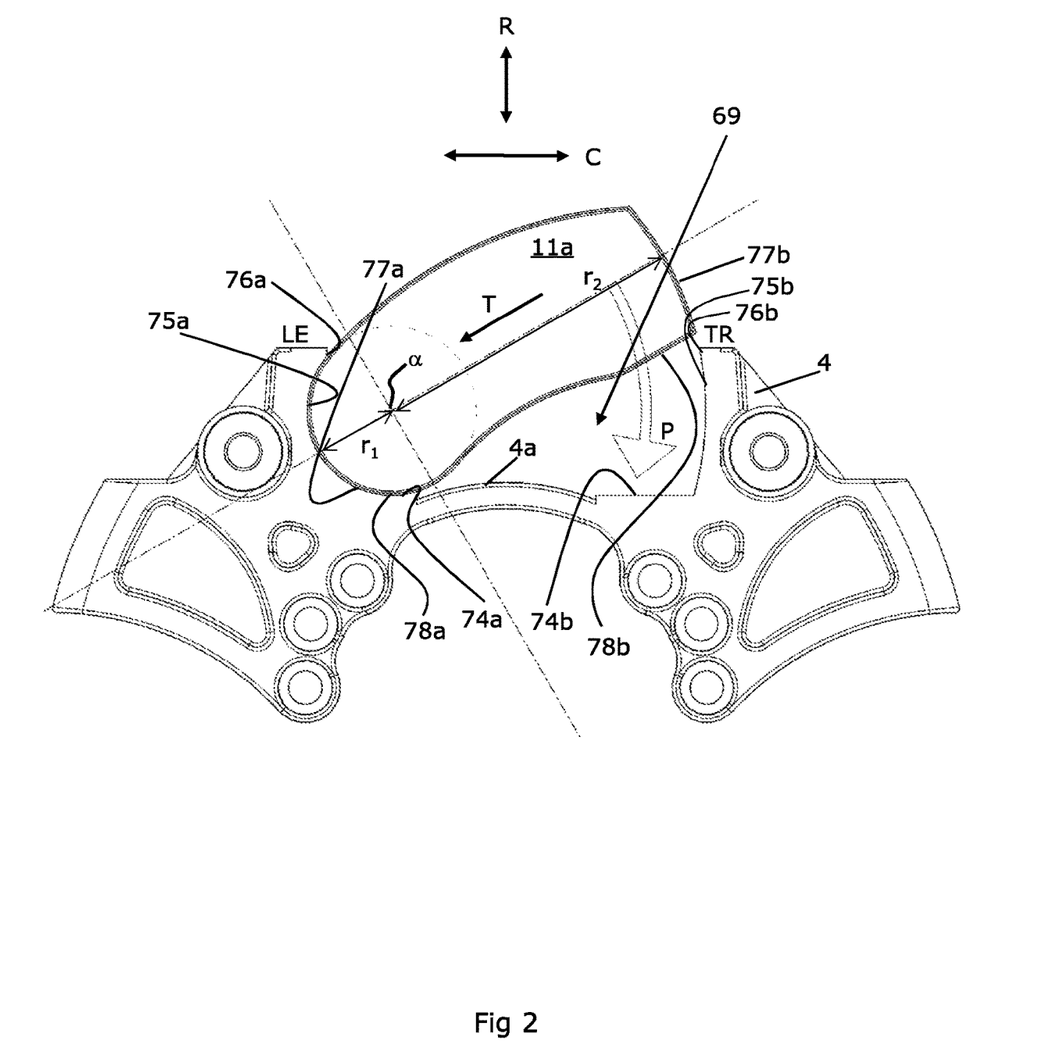
FIGS. 2 and 3 are side views of a brake pad and carrier of the disc brake of FIG. 1 in a part-fitted and fitted position respectively.

With reference to FIG. 2, the carrier 4 has radial pad abutment surfaces 74a, 74b to support the inboard pad 11a in a radial direction. The radial abutment surfaces 74a, 74b are located either side of an arched 'link' portion 4a of the carrier, the link portion 4a connecting the left and right sides of the carrier 4.

The carrier 4 further comprises a first and second circumferential pad abutment surfaces 75a and 75b. The radial pad abutment surfaces 74a, 74b and circumferential pad abutment surfaces 75a and 75b are machined in this embodiment, but they could be forged, or just left as cast as desired.

The circumferential and radial pad abutment surfaces 74a, 74b, 75a and 75b define the inboard pad support structure 69 that is arranged to support the inboard pad 11a in a radially inward and circumferential (i.e., rotational) direction. As the brake is actuated, the abutment surfaces 74a, 74b, 75a and 75b react the torque that is created as the inboard pad 11a clamps the rotor 10. The abutment surfaces also act to locate the inboard brake pad 11a.

Figure 3:
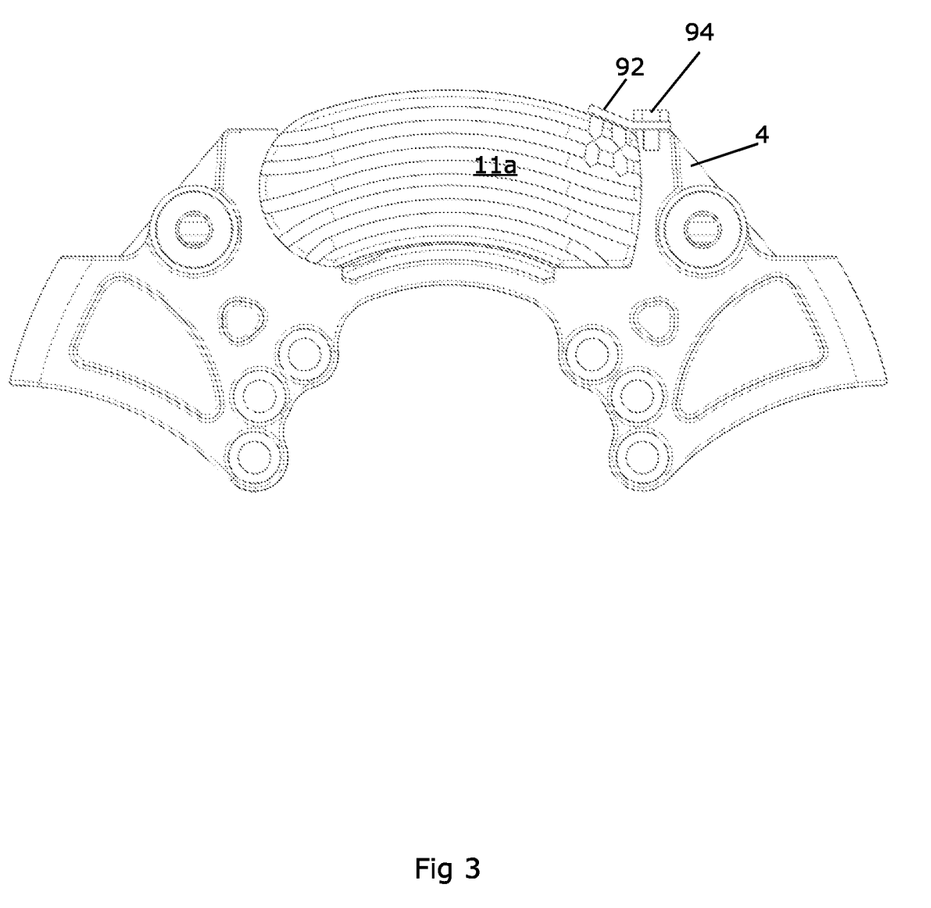
Figure 4:
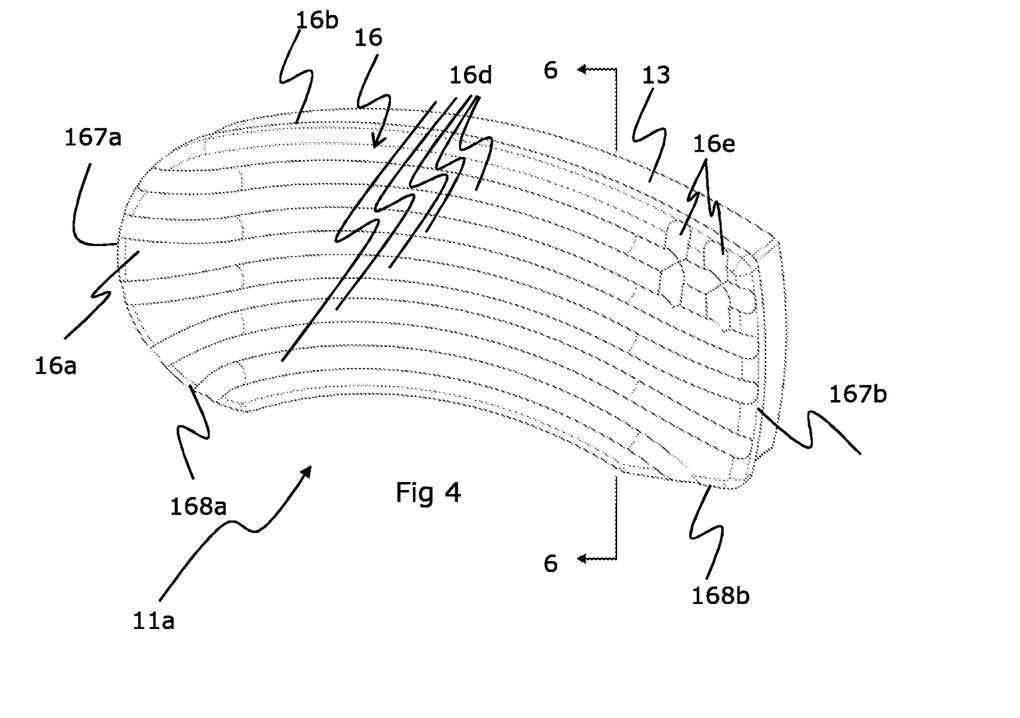
FIGS. 4 and 5 are isometric views of a brake pad of the disc brake of FIG. 1 from opposing directions.
Figure 5:
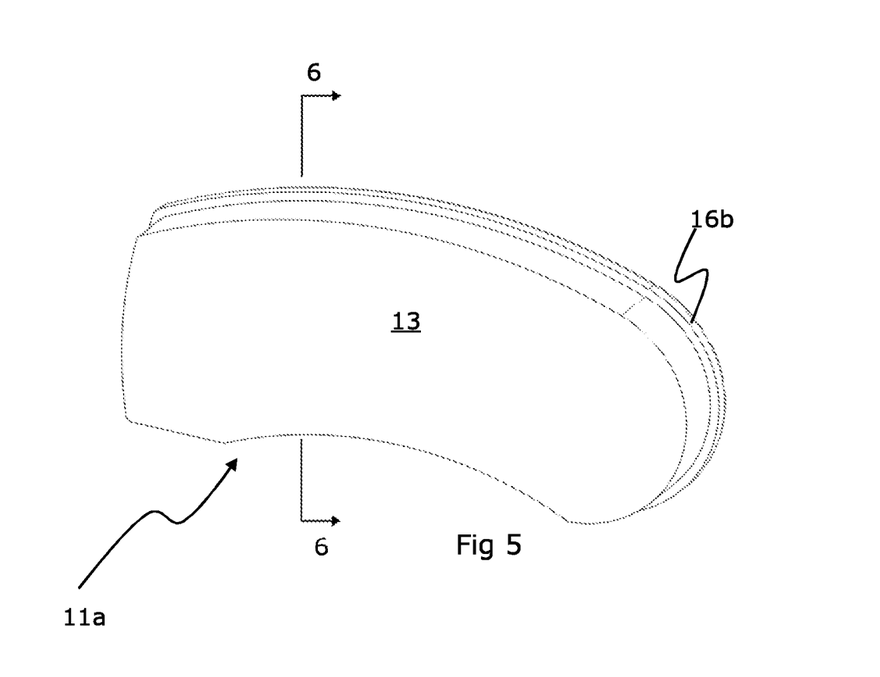

The inboard brake pad 11a and the corresponding inboard pad support structure 69 comprise complementary profiles on circumferential faces thereof arranged so as to permit the brake pad to be inserted into the mounting structure in a transverse direction T of the brake pad 11a and at an angle to the circumferential direction C of the structure until the pad abuts the first circumferential abutment surface 75a, and then for the brake pad to be pivoted in a direction P about a fixed center of rotation X when the first circumferential surface 77a of the brake pad is in contact with the first circumferential abutment surface 75a of the structure to be brought into a fitted position in the structure. The fitted position is shown in FIG. 3.

In this embodiment, the first circumferential surface 77a of the inboard brake pad 11a has a profile that defines a part circular segment of a first fixed radius r1 for contact with the complementary first circumferential abutment surface 75a. It will also be appreciated that in this embodiment a first radial surface 78a of the brake pad is partially contiguous with the first circumferential abutment surface 77a. In other words, because the surface is curved it transmits force with both a circumferential and radial component in some locations.

In addition, the first circumferential abutment surface 75a extends around the first circumferential surface of the inboard brake pad 11a such that a gap distance from the radially outermost tip 76a of the first circumferential abutment surface 75a to the corresponding tip 76b of the second circumferential abutment surface 75b is less than the greatest distance between corresponding points on the two circumferential abutment surfaces 75a, 75b radially inward of the tips. In other words, a portion of the first circumferential abutment surface 75a radially outward of the brake pad extends above a portion of the brake pad 11a at the first end thereof.

This means that in effect the brake pad is accommodated within a curved undercut defined by the first circumferential abutment surface 75a. This prevents the brake pad 11a being lifted from the inboard pad support structure 69 by it pivoting about the second end of the brake pad, rather than about the first end of the brake pad i.e., only fitting and removal in the way described below is possible when the disc brake 2 is assembled.

The second circumferential surface of the brake pad 77b has a profile that also defines a part circular segment of a second fixed radius r2. The second fixed radius is greater than the first fixed radius and is arranged to contact the complementary second circumferential abutment surface 75b, which is also part-circular with a similar radius.

In order that the brake pad 11a, when fitted, has a large bearing area in contact with the second circumferential abutment surface 75b for transmitting the brake force under braking, the center of the second radius r2 substantially coincides with the center a of the first radius r1.

In this embodiment, the second radial surface of the brake pad 78b has a generally planar profile and is arranged to contact the complementary second radial abutment surface 74b, which is also generally planar.

The second radial abutment surface 74b, in contrast to the first, is arranged with a defined angle at its intersection to the second circumferential abutment surface 75b, in order to support the brake pad in a radially inward direction at its second end. In some variants of the carrier (not shown) a stress-relief feature may separate the second radial and circumferential abutment surfaces 74b, 75b, however.

The first circumferential abutment surface 75a is arranged on a leading side (denoted LE) of the disc brake with respect the usual direction of rotation of the rotor 10 (clockwise in FIG. 2). The second circumferential abutment surface 75b is arranged on the trailing side (denoted TR). Thus, in the forward direction of movement of a vehicle to which the disc brake 2 is fitted, the forces acting on the brake pad 11a tend to hold the brake pad within the pad support structure without additional retention structures coming into use.

However, since vehicles typically also maneuver in a reverse direction (at low speed and for a small proportion of their operating time), the geometry set out above may require a structure to counteract the forces acting on the brake pad 11a when rotation of the rotor 10 is reversed. Thus, as is shown in FIG. 3, a pad retainer in the form of a plate 92 is provided, which extends from the second circumferential abutment 75b over part of the radially outer face of the brake pad 11a. A bolt 94 (or other appropriate fastening component) passes through the plate 92 and into a threaded bore in the carrier 4, to releasably secure the plate 92 in place.

In the disc brake 2 of FIG. 1 the outboard pad support structure 70 is arranged so as to have a similar geometry of radial and circumferential abutment surfaces 74a, 74b, 75a, 75b in order to receive and support an outboard brake pad 11b with similar or identical shape to the inboard brake pad 11a. In other embodiments, the outboard pad may have a different geometry and this may be advantageous in some circumstances, dependent upon functional requirements of the brake and/or whether some form of "poka-yoke" feature (foolproofing of fitting of pads in inboard and outboard locations) is to be provided.

Thus, a fitting operation of the outboard brake pad 11b is similar to that of the inboard brake pad 11a. However, whilst the inboard brake pad 11a is mounted on the carrier 4 of disc brake 2 via the inboard brake pad support structure 69 the outboard brake pad 11b is mounted to the bridge 5 of the caliper 3 by the outboard brake pad support structure 70. As such, the outboard brake pad 11b is supported radially and circumferentially by the caliper 3 when fitted in the outboard brake pad support structure 70. The equivalent radial and circumferential abutment surfaces of the outboard brake pad support structure 70 are provided in a face of the bridge 5 that is adjacent the rotor 10. However, as the position of the outboard pad 11b is fixed inboard-outboard with respect to the bridge 5, the abutment surfaces do not need to be as deep inboard-outboard as in the carrier 4, e.g., they may only be as deep as the corresponding circumferential and radial surfaces on the outboard brake pad 11b.

So as to maintain the benefit of the outboard brake pad 11b being inherently retained in the outboard pad support structure 70 in the normal rotational direction, in this embodiment, the inboard and outboard brake pads 11a, 11b are shaped such that when facing each other in a parallel relationship with friction material facing friction material, the brake pads have mirror symmetry about a plane parallel to friction faces of the brake pads and rotor 10. Thus, when fitted within the disc brake 2 as illustrated in FIG. 1, the pads have mirror symmetry about a plane normal to the center of rotation CR of the rotor 10 at the axial midpoint of the rotor.

This arrangement means that the pad retaining plate 92 for the outboard brake pad 11b is at the same trailing side of the pad as for the inboard brake pad, but is instead secured in a threaded bore on the bridge 5. A benefit of this pad shape is that it inherently provides a poka-yoke feature that prevents an individual pad being fitted in a reversed orientation within its corresponding support structure (i.e., with the backplate rather than friction material facing the rotor).

The friction material 13 of the brake pads 11a and 11b is mounted to a strengthening backplate 16 e.g., of metallic material. The friction material 13 at the circumferential surfaces of the backplate follows substantially the same profile as the backplate 16. However, for manufacturing reasons the friction material is stepped in from the entire perimeter surface by up to 4 mm. This arrangement optimizes the weight to friction material volume ratio of the brake pads, which is made possible by the simple pad retention arrangement in particular. The profile of the friction material and the backplate on the radially outermost and radially innermost edges (intermediate radial surfaces 78a, b) follows as closely as possible the contact area of the rotor so as to maximize the swept pad area.

Fitting of either brake pad 11a, 11b into the caliper is a simple matter of inserting the brake pad into the mounting structure in a transverse direction T of the pad and at an angle to the circumferential direction of the structure and then pivoting the brake pad about a fixed center of rotation when a circumferential surface of the brake pad is in contact with a complementary circumferential surface of the structure until the brake pad is brought into the fitted position in the structure in which the second radial surface 78b of the brake pad rests on the second radial pad abutment surface 74b. The pad retainer plate 92 may then be secured over the pad 11a, 11b by tightening down the bolt 94. Removal is achieved by the reverse procedure.

The construction of the backplate is now discussed in more detail in relation to FIGS. 2 to 7. The strengthening backplate 16 of the brake pads 11a, 11b must have sufficient strength and integrity to withstand the forces acting on brake pads during braking, and as the vehicle to which the disc brake is fitted travels, e.g., over uneven surfaces.

Figure 6:
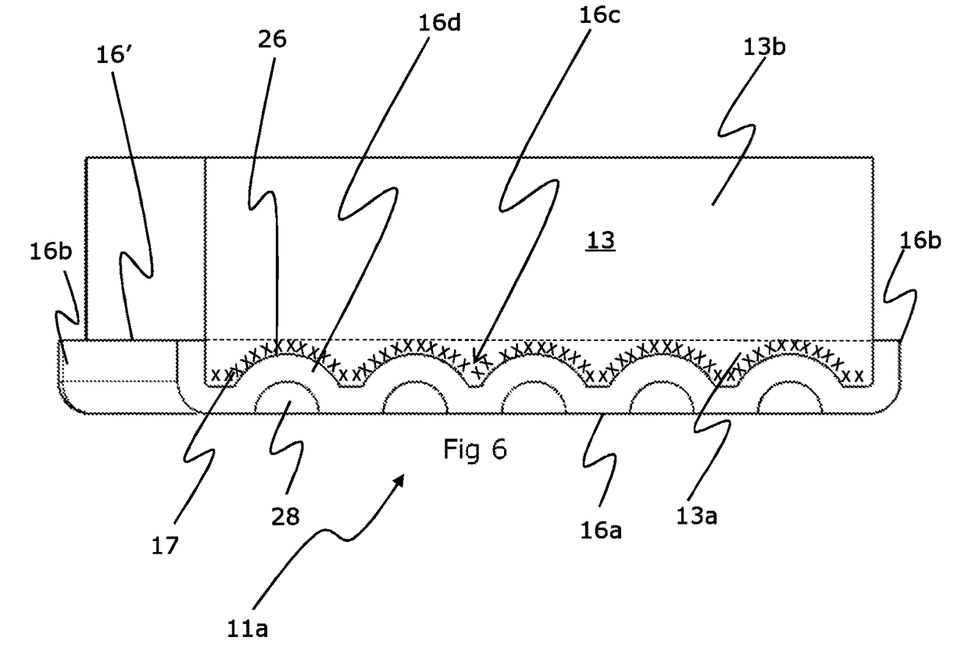
FIG. 6 is a cross-sectional view through the brake pad of FIGS. 4 and 5 on a plane 6-6.
Figure 7:
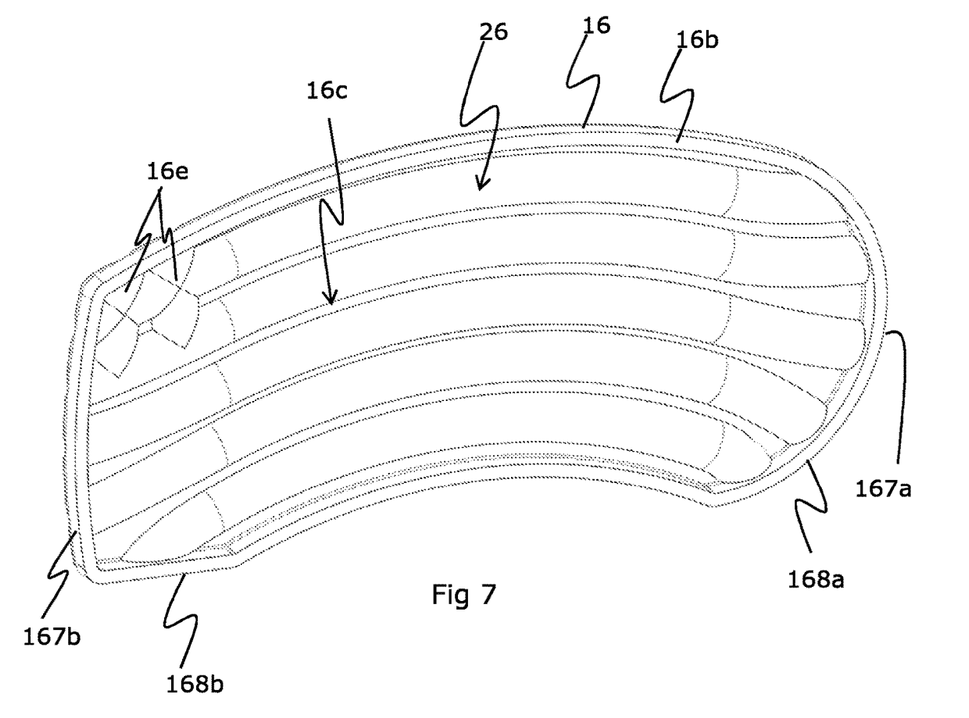
FIG. 7 is an isometric view of a backplate of the brake pad of FIGS. 4 to 6.

As shown in FIGS. 6 and 7, the strengthening backplate 16 comprises a rear wall 16a with an inner surface facing towards and for supporting the friction material 13 and an outer, opposing surface facing away from the friction material. When mounted for use, the inner surface faces the brake rotor 10 of the disc brake and the outer surface faces away from the rotor.

The strengthening backplate may comprise at least one stiffening flange extending from the inner surface side of the rear wall. The at least one stiffening flange may surround at least a perimeter portion of the rear wall. The stiffening effect of the flange helps to strengthen the backplate as well as increasing the area in contact with corresponding abutment surfaces of the disc brake 2.

In the embodiment depicted in FIGS. 3 to 7, the strengthening backplate comprises a stiffening peripheral flange 16b fully encircling the perimeter of the rear wall. The rear wall 16a defines a plane and the stiffening peripheral flange 16b extends substantially perpendicular from the inner surface side of the rear wall. First and second circumferential portions 167a, 167b of peripheral flange define the first and second circumferential surfaces 77a, 77b of the brake pad. First and second radial portions 168a, 168b of the peripheral flange define the first and second radial surfaces 78a, 78b of the brake pad.

The rear wall and at least one stiffening flange form a trough on the friction material side of the brake pad. In the embodiment depicted, the rear wall 16a and peripheral flange 16b define a trough 16c having a tub shape.

The trough is configured to accommodate at least one functional component of the brake pad. The functional component may be selected from a bonding to bond the friction material to the backplate, a thermal insulator to inhibit the transfer heat from the friction material into the backplate of the brake pad, and a noise dampener to absorb noise generated by the brake pad and/or to alter the resonant frequency of the brake pad. The bonding may comprise a steel mesh around which the friction material may be formed.

The trough may additionally accommodate a rear portion of friction material.

In the embodiment depicted in FIGS. 3 to 7, the friction material is attached to the inner surface of the rear wall 16a using a friction material bonding 17. As shown, a rear portion 13a of the friction material and layer of friction material bonding 17 is located in the trough 16c of the backplate, whilst a front portion 13b of the friction material protrudes from the backplate. The rear portion may be a wear limit portion of the friction material and the outer edge of the flange 16' may define a wear limit of the friction material.

The trough is substantially filled by the at least one functional component (e.g., a bonding, thermal insulator and/or noise dampener), and optionally the rear portion of the friction material. Substantially filling the trough enhances the stiffening of the at least one flange and reduces the risk of plastic deformation during operation. By substantially filling the trough, the friction material at the circumferential surfaces of the backplate follows substantially the same profile as the backplate 16. The friction material is stepped back from the outer perimeter of the backplate by the thickness of the at least one flange. The at least one flange provides additional mechanical contact between the friction material and the backplate, aids bonding and reduces the risk of the friction material becoming separated from the backplate during braking. Further, by filling the trough, the risk of water and other foreign matter entering a gap between the at least one flange and the friction material etc. and causing corrosion is minimized.

By recessing the at least one functional component (e.g., a bonding, thermal insulator and/or noise dampener), and optionally a rear portion of the friction material in the backplate, the thickness of sacrificial friction material in the brake pad that may be worn away in operation can be increased and the lifespan of the brake pad improved.

The backplate 16 may alternatively or additionally comprise at least one stiffening rib to help strengthen the backplate. The at least one stiffening rib is configured to help strengthen the backplate with respect to the forces acting on the brake pad during use. The forces may include, for example, a retaining force from a retainer, an applied load of the piston, an applied clamping force, a drag braking force induced between the friction material and rotor, and/or abutment forces from the abutment surfaces. The at least one stiffening rib may also be configured to change the eigen frequency of the backplate and thereby help to reduce the generation of squeal noise during operation.

The at least one stiffening rib may comprise a recess and/or ridge arranged on the rear wall. The rib may comprise a recess formed in the rear wall 16a of the backplate, preferably on the outer surface of the rear wall. The recess may have any suitable cross-sectional profile including for example, a curved profile, flat-bottomed profile or saw-tooth profile. Preferably, a rib recess shaped on one surface of the rear wall forms a corresponding rib ridge on the opposing surface of the rear wall. For example, a rib recess formed on the outer surface of the rear wall forms a corresponding rib ridge on the inner surface of the rear wall. The ridge may aid the attachment of the insulator, noise dampener and/or friction material in the trough.

In the embodiment depicted in FIGS. 3 to 7, the backplate 16 comprises a plurality of elongate stiffening ribs 16d formed in the rear wall 16a to help strengthen the backplate. As shown in the FIGS. 4, 6 and 7, the ribs are elongate ridges 26 arranged on the inner face of the rear wall facing the friction material 13 and corresponding recesses 28 arranged on the outer face of the rear wall. The ridges 26/recesses 28 have a cross-sectional curved profile.

In this particular embodiment, the elongate stiffening ribs 16d are configured to help strengthen the backplate with respect to an applied load of the piston, an applied clamping force, a drag braking force induced between the friction material and rotor, and/or abutment forces from the abutment surfaces. The elongate stiffening ribs are also configured to tune the backplate and improve its noise behavior.

To improve the force distribution across the backplate the elongate stiffening ribs 16d extend across the full width of the rear wall 16a. To optimize the reaction of the brake pad to the drag brake force, the elongate stiffening ribs 16d are configured to follow the vector pathway of the tangential drag force acting across the rear wall. To counter abutting forces of the abutment surfaces acting on the brake pad, the elongate stiffening ribs 16d are configured to extend across the rear wall 16a between the first and second circumferential surface portions 167a, 167b of the peripheral flange and between the first and second radial surface portions 168a, 168b of the peripheral flange. To optimize the stiffening effect and help minimize plastic deformation of the backplate at the abutment interface, each stiffening rib is substantially perpendicular to the intersection between the rear wall and peripheral flange.

The backplate may further or alternatively comprise at least one stiffening rib formed in the rear wall that is configured to strengthen the backplate with respect to retaining forces applied by a brake pad retainer. The retaining forces generally act on a localized region of the backplate and so the at least one local stiffening rib is preferably arranged in the region of the rear wall adjacent to the brake pad retainer. To further strengthen the embodiment of the brake pad depicted in FIGS. 3 to 7 with respect to the retaining forces applied by the pad retainer plate 92, local stiffening ribs 16e are formed in a region of the rear wall adjacent the pad retainer. To optimize the stiffening effect and help minimize plastic deformation of the backplate by the pad retainer each stiffening rib is orientated to extend in a substantially perpendicular direction to the interface between the pad retainer plate 92 and rear wall.

The provision of the at least one flange and/or at least one stiffening rib allows for the thickness of the backplate material to be reduced whilst maintaining a backplate with sufficient strength and integrity to withstand the braking forces and travel forces acting on the vehicle in which the disc brake is fitted.

The enhanced stiffening effect of the at least one flange (e.g., peripheral flange 16b) and/or the at least one stiffening rib (e.g., stiffening ribs 16d, 16e) allows the backplate 16 to be formed from relatively thin sheet metal material.

The sheet metal material preferably has a thickness of approximately 4 mm or less. The trough may preferably have a depth of between approximately 5 mm to approximately 7 mm. Backplates 16 can be formed from a sheet metal, e.g., sheet steel, having a thickness of between approximately 1 mm to approximately 4 mm, preferably approximately 3 mm.

By using relatively thin sheet metal material the overall mass of the backplate is minimized, which in turn leads to environmental and costs benefits. Also, the backplate may be press-formed from the sheet metal material and cheap to manufacture.

In the embodiment depicted in FIGS. 3 to 7, the backplate 16 is press-formed from a sheet steel plate having a thickness of approximately 3 mm, whereby the rear wall and peripheral flange are integrally formed from the same sheet of material as a starting point and the trough has a depth of approximately 7 mm.

The backplate is preferably manufactured from a blank of sheet metal plate (normally coils of sheet metal plate) and press-formed between appropriate contoured dies in a press to form the at least one stiffening rib and/or at least one flange. The method of making the backplate comprises the initial step of cutting a blank from sheet metal. The method may further comprise the step(s) of pressing the blank to form ridges/recesses so as to define at least one stiffening ribs and/or drawing the blank in a press to turn the outer edges of the sheet metal to an angle approaching 90° so as to form the rear wall and at least one flange.

In other embodiments, the backplate can be cast, or formed using other suitable processes.

Figure 8:
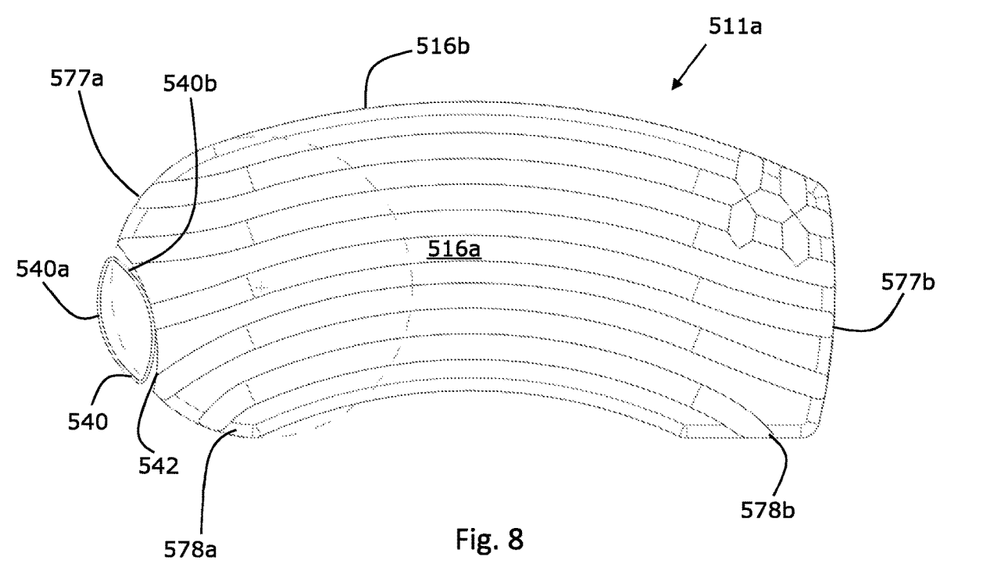
FIG. 8 is a side view of a brake pad according to an embodiment of the present invention.
Figure 9:
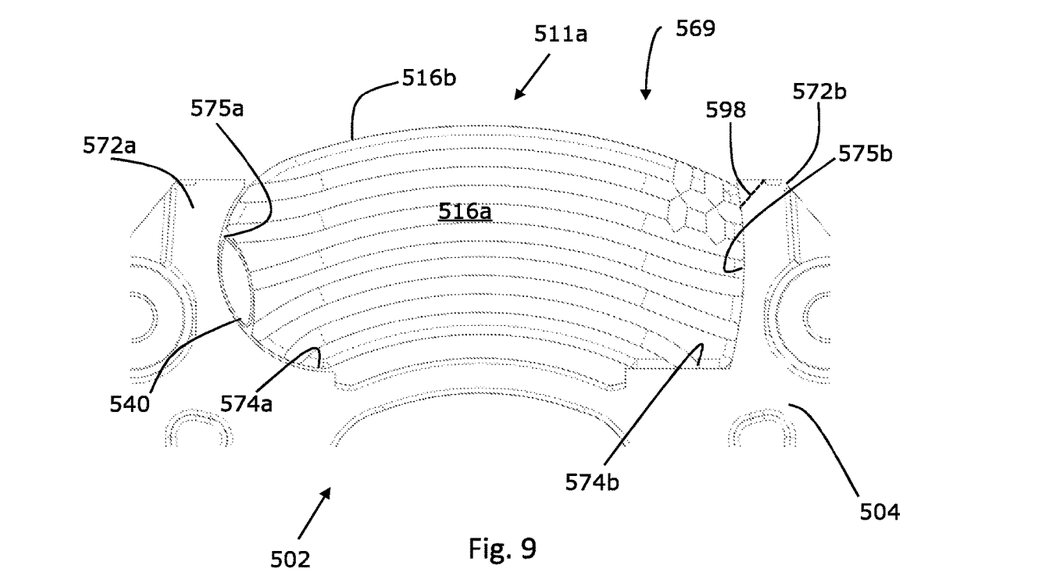
FIG. 9 is a side view of the brake pad of FIG. 8 located within a brake carrier of a disc brake according to an embodiment of the present invention.

With reference to FIGS. 8 and 9 a brake pad 511a according to an embodiment of the present invention is shown. Like parts, as compared with the brake pads and disc brakes described above, are denoted by like numerals but with the addition of the prefix "5". Only those parts that differ in relation to the preceding drawings are discussed in detail below.

As in preceding examples, the first, inboard, brake pad 511a comprises a layer of friction material (not visible) having a friction face for contacting and retarding rotation of a rotor (not shown). The brake pad 511a is of a similar general perimeter profile to the brake pad 11a, having a first circumferential end surface 577a and a second circumferential end surface 577b for contact with first and second corresponding circumferential pad abutment surfaces 575a and 575b of the abutment structures 572a, 572b of a brake carrier 504 of a disc brake 502.

The brake pad 511a differs from brake pad the brake pad 11a in that it further comprises a first spring 540. This first spring 540 forms part of the first circumferential end surface 577a and, when fitted within the inboard pad support structure 569, is arranged to contact the first circumferential pad abutment surface 575a and urge the brake pad, in use, towards the second circumferential pad abutment surface 575b with a preload of a predetermined amount. In other words, it provides a force acting in a plane that is aligned with the general plane of the pad itself.

It will be appreciated that in order for the brake pad 511a to be fitted and slide towards the rotor in various conditions within the inboard pad support structure 569, some clearance between the brake pad 511a and the circumferential pad abutment surfaces 575a and 575b is needed (typically of the order of 1 mm). However, the first spring ensures that in a static condition, the clearance is present solely between the first circumferential surface 577a and the first circumferential pad abutment surface 575a.

In this embodiment, the first spring 540 is arranged at an end of the brake pad 511a intended to be the leading end in use. As a result, the spring urges the brake pad 511a in the same direction as the rotor under braking in its usual rotational direction. This means that typically the clearance will be zero at the contact area between the second circumferential surface 577b and the second circumferential pad abutment surface 575b. This leads to a reduction in rattling of the brake pad 511a within its corresponding support structure and assists in retaining the brake pad within its corresponding support structure 569 as there is a frictional resistance to its pivoting out for removal.

In FIGS. 8 and 9 it can further be seen that a spring force vector of the first spring 540 acts in a generally circumferential direction. In other words, rather than acting directly towards the opposing pad abutment surface 575b, the spring force acts at a tangent to the rotation of the rotor and therefore in the same direction as the brake force during a braking operation.

The first spring 540 is accommodated within a recess 542 of the first circumferential surface 577a of the brake pad 511a. In this embodiment the first spring 540 is a leaf spring formed of first and second arcuate leaves 540a and 540b connected to define a lens-shaped spring. The first spring 540 is formed of a suitably resilient and durable material, such as spring steel. The recess 542 is a convex arc arranged to conform to the second leaf 540b when in its compressed condition. In addition, this arrangement permits the first leaf 540a, in a compressed condition, to adopt a curved shape that is of a similar shape and radius to the remainder of the first circumferential surface 577a, thereby maximizing the bearing surface in contact with the first circumferential pad abutment surface 575a, when fitting as illustrated in FIG. 9.

For the brake pad 511a of the type illustrated in which the backplate is manufactured from a metal sheet, having a thickness of up to 4 mm press-formed to define a rear wall 516a and a flange 516b at substantially 90° thereto, the first spring 540 is mounted to the flange where it forms the spring recess 542. As both the flange 516b and the spring 540 are relatively thin sheets of metal in face-to-face contact, this permits the connection to be achieved conveniently in a number of ways. In this embodiment, the connection is a rivet, but in other embodiments, other fasteners could be used, as could spot welding, adhesives or shaping/forming the one or both of the components to be a form-fit with each other.

Although not shown in FIG. 9, the brake pad 511a may be held down proximate the second circumferential surface by a retainer such as the plate 92 and bolt 94 as described above.

In an alternative embodiment (not shown), the first spring is formed from the same piece of material as the backplate as an integral or monolithic component. In the case of a stamped sheet metal backplate, an extra section of material may be stamped from the sheet as part of a single blank and then formed into the spring in a folding and/or pressing operation.

In a further alternative embodiment (not shown), a second spring is provided on the brake pad. The second spring forms at least part of the second circumferential surface 577b and is arranged to contact the second circumferential pad abutment surface 575b. The spring may a similar leaf spring formed of opposing leaves as the first spring 540. However, the spring is preferably formed by arcuate leaves of a greater radius than the first spring so as to conform to the greater radius of the arc of the second circumferential surface 577b. The addition of a second spring may further reduce pad rattle and enhance pad retention.

Fitting of the brake pad 511a is achieved in a similar manner to the brake pad 11a described above. However, as part of the insertion process it is necessary for the spring 540 to be compressed. Brake pads of the type described are typically lighter than a stamped or cast pad with a similar swept pad area, and therefore a weaker spring may be required that can be manually depressed by a fitter upon insertion. Fitting the brake pad may however be assisted by providing a chamfer on the radially outer edge of the second abutment structure (shown by broken line 598 in FIG. 9) to act as a wedge so that pushing down on the second end of the pad also depresses the spring 540. The wedge function to help fitment can also be achieved by an appropriate chamfered shape of the pad backplate where the second circumferential 577b and radial 578b surfaces meet, which also allows large spring forces on the spring 540 to be overcome. The trajectory and rotational fitment is per se advantageous for the spring fitment because it acts like a lever or gear device around the pivot point.

Once the brake pad is in the fitted position of FIG. 9, a suitable retainer may be secured over the pad as described in relation brake pad 11a above.

Although the description of the brake pad has been in relation to an inboard brake pad 511a, it will be appreciated that one or two springs may also be used on a brake pad to be fitted in an outboard pad support structure. The outboard pad support structure may be part of the carrier 504, or may be part of a caliper. The inboard and outboard brake pads may be identical and interchangeable inboard-outboard in some embodiments, be "handed" and have mirror symmetry as is the case for the pads 11a and 11b as described above, or be dissimilar in profile, e.g., to provide a poka-yoke fitting.

Numerous changes may be made within the scope of the present invention. For example, cantilevered leaf springs, circular springs or coil springs may be used. Multiple springs may be provided in the first and/or the second circumferential surface(s). A spring may be provided in the circumferential surface intended to be at the trailing edge of the brake pad only. Springs may be used in similar locations with brake pads that have a profile similar to brake pad 511a, but which are manufactured by conventional casting or stamping operations. In addition, similar spring(s) may be provided in brake pads that have a conventional profile (i.e., similar to FIG. 10, but with recess(es) to accommodate the spring(s) on circumferential surfaces). A brake pad with a conventional profile may however be manufactured by a pressing operation with flanges as described above. Rather than the spring(s) being sheets or strips of material, they may instead be formed of wire material with a generally circular cross-section. The brake pad backplate may not have a flange around its entire perimeter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake pad for a heavy vehicle disc brake, the brake pad comprising:
    a layer of friction material having a friction face for contacting and retarding rotation of a brake rotor, the brake pad defining a first circumferential surface and a second circumferential surface for contact with a first circumferential pad abutment surface and a second circumferential pad abutment surface, respectively, of a disc brake in use; and
    a first spring forming at least part of the first circumferential surface and arranged to contact the first circumferential pad abutment surface and urge the brake pad, in use, towards the second circumferential pad abutment surface, wherein the first circumferential surface is curved and the first spring, at least in a compressed condition, is curved in a similar shape as the first circumferential surface.

2. The brake pad of claim 1 wherein the first spring is accommodated within a recess of the first circumferential surface of the brake pad.

3. The brake pad of claim 1 wherein the first spring is a leaf spring.

4. The brake pad of claim 3 wherein the leaf spring is lens-shaped.

5. The brake pad of claim wherein the leaf spring has first and second arcuate leaves that are connected at opposing ends.

6. The brake pad of claim 1 wherein a spring force vector of the first spring acts in a generally circumferential direction.

7. The brake pad of claim 1 wherein the first spring is arranged at an end of the brake pad that is a leading end in use.

8. The brake pad of claim 1 wherein the brake pad includes a backplate arranged to support the layer of friction material and the first spring is mounted to the backplate.

9. The brake pad of claim 8 wherein the backplate is manufactured from a metal having a thickness of up to 4 mm and defining a rear wall and a flange at substantially 90° thereto forming part of the first circumferential surface.

10. The brake pad of claim 9 wherein the first spring is mounted to the flange.

11. The brake pad of claim 8 wherein the first spring is formed from the same piece of material as the backplate as a monolithic component.

12. The brake pad of claim 1 further comprising a second spring forming at least part of the second circumferential surface and arranged to contact the second circumferential pad abutment surface.

13. A heavy vehicle disc brake comprising:
   a first brake pad for contacting a first face of a brake rotor, the first brake pad including:
   a layer of friction material having a friction face for contacting and retarding rotation of the brake rotor,
   a first circumferential surface and a second circumferential surface; and
   a first spring forming at least part of the first circumferential surface;
   a second brake pad for contacting a second face of the brake rotor that is disposed opposite the first face;
   a brake caliper for confining the first and second brake pads in at least as inbound-outbound direction;
   an actuation mechanism housed within the brake caliper for selectively bringing the first and second brake pads into contact with the brake rotor; and
   a first brake pad support structure and a second brake pad support structure for restraining the first brake pad and the second brake pad, respectively, in a circumferential direction, wherein the first brake pad support structure has first and second abutment structures defining first and second circumferential pad abutment surfaces that contact and support the first brake pad in the circumferential direction, wherein the first circumferential pad abutment surface has a curved shape complementary to a curved shape of the first circumferential surface of the first brake pad, wherein the first spring at least in a compressed condition, is curved in a similar shape as the first circumferential surface.

14. The disc brake of claim 13 wherein the second brake pad includes:
   a layer of friction material having a friction face for contacting and retarding rotation of the brake rotor,
   a first circumferential surface and a second circumferential surface; and
   a first spring terming at least part of the first circumferential surface.

* * * * *

UNITED STATES PATENT AND TRADEMARK OFFICE
CERTIFICATE OF CORRECTION

PATENT NO. : 10,724,585 B2
APPLICATION NO. : 15/995482
DATED : July 28, 2020
INVENTOR(S) : Dietmar Knoop Page 1 of 1

It is certified that error appears in the above-identified patent and that said Letters Patent is hereby corrected as shown below:

In the Claims

Column 12, Line 65, Claim 5:
After "The brake pad of claim"
Insert -- 4 --.

Column 14, Line 28, Claim 14:
After "a first spring"
Delete "terming" and
Insert -- forming --.

Signed and Sealed this
Eighth Day of December, 2020

Andrei Iancu
*Director of the United States Patent and Trademark Office*